United States Patent [19]

Tentler

[11] Patent Number: 5,033,644

[45] Date of Patent: Jul. 23, 1991

[54] PRECISION DISPENSING OF VARYING VISCOSITY FLUIDS IN A PRESCRIBED MIX RATIO

[76] Inventor: Michael L. Tentler, 11420 Luz Rd., San Diego, Calif. 92127

[21] Appl. No.: 331,880

[22] Filed: Mar. 31, 1989

[51] Int. Cl.[5] .............................................. B67D 5/56
[52] U.S. Cl. ................................... 222/57; 73/861.02; 73/861.54; 222/63; 222/71; 222/129.4
[58] Field of Search ............... 222/129.1, 129.2, 129.3, 222/129.4, 57, 71, 145, 63, 52; 73/861.53, 861.54, 861.58; 137/100, 101.19, 98, 99

[56] References Cited

U.S. PATENT DOCUMENTS 3,642,171  2/1972  Ernst ................................ 222/57 X
3,948,419  4/1976  Polster ........................ 222/129.1 X
4,886,190  12/1989  Kirschner et al. ............... 222/63 X

FOREIGN PATENT DOCUMENTS 0266202  5/1988  European Pat. Off. ......... 222/129.1

Primary Examiner—Kevin P. Shaver
Attorney, Agent, or Firm—William C. Fuess

[57] ABSTRACT

The flow rate of fluid components, typically water and syrup, is sensed by a flowmeter that is substantially insensitive to variations in fluid pressure and/or viscosity. A feedback circuit which may be either analog or digital permits the regulation of fluid flows to be in a precisely prescribed relative proportion. This proportion may be changed by varying the amplification gain of the feedback circuit in the analog configurations, or by programming a new ratio quantity in the digital configuration of the control circuit. The digital control circuit integrates the total fluid flow, and maintains historical records of the total fluid volume and portions dispensed. The dispensed volume of any particular portion may be predetermined by manually demarking the time interval over which such volume is flowed. The historical records of dispensing activity are securely stored and may be inspected in order to compare such activity to receipts derived from sale of the dispensed beverage only by an authorized interrogation device.

12 Claims, 7 Drawing Sheets

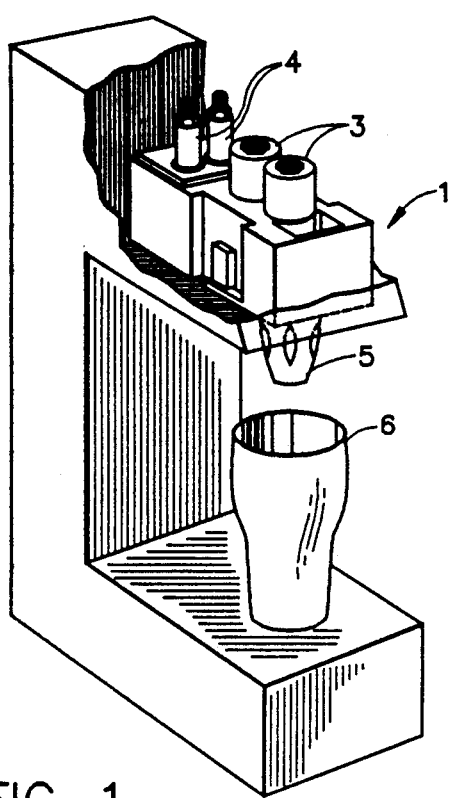
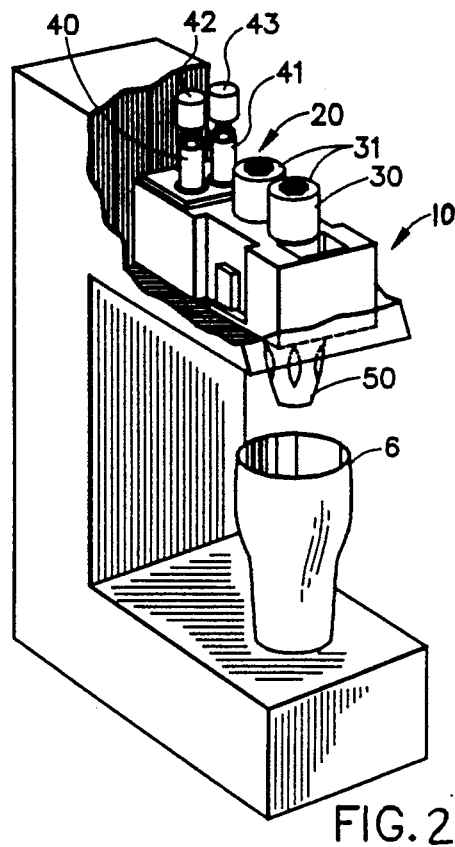
FIG. 1
PRIOR ART
FIG. 2
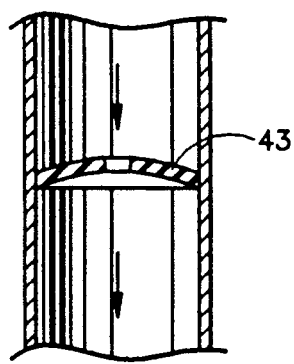
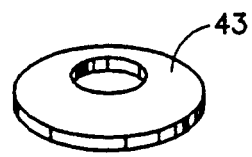
FIG. 5a
PRIOR ART
FIG. 5b
PRIOR ART

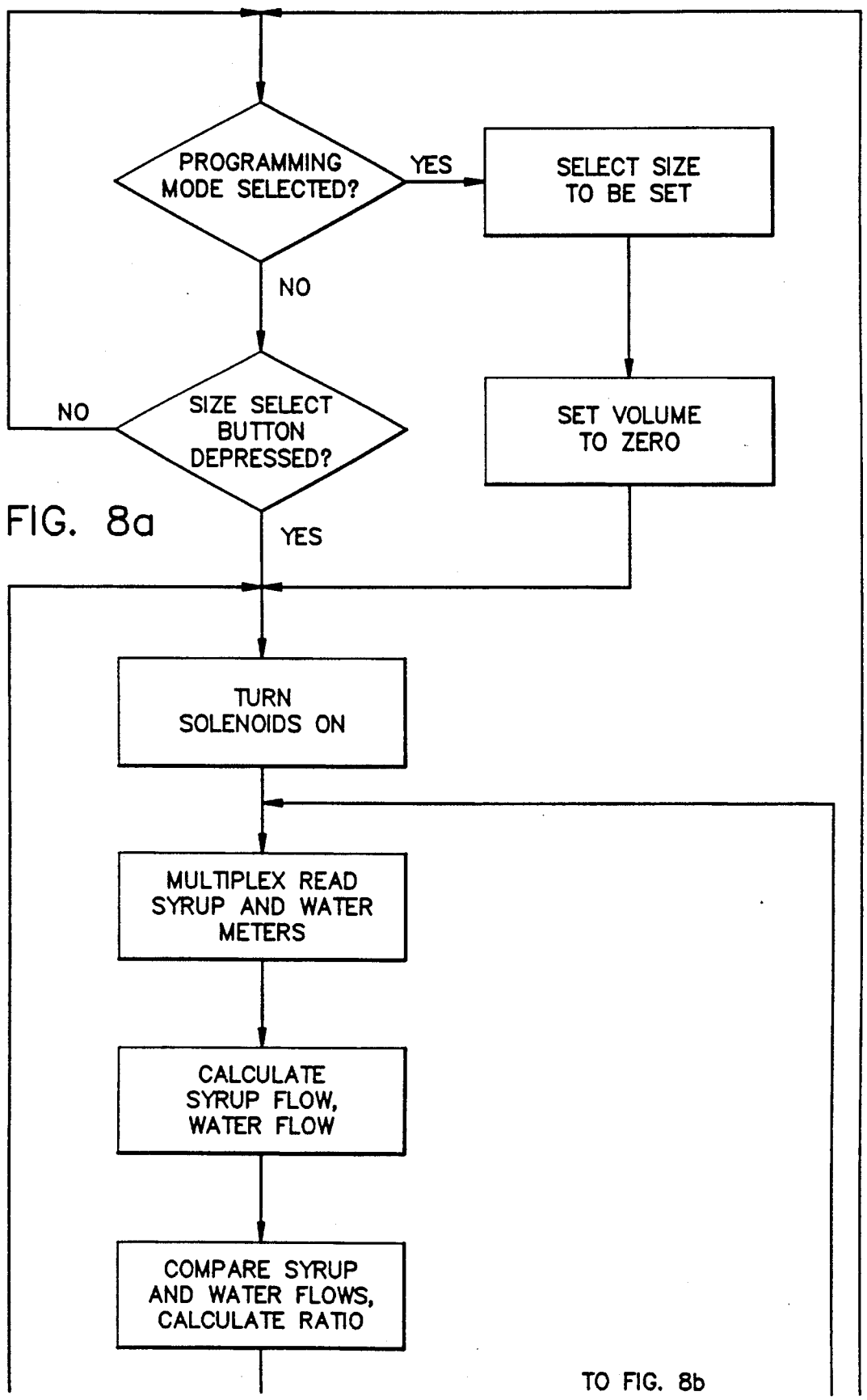

PRECISION DISPENSING OF VARYING VISCOSITY FLUIDS IN A PRESCRIBED MIX RATIO

BACKGROUND OF THE INVENTION

1. Field of the Invention

The present invention generally concerns fluid dispensing systems, and particularly systems for mixing two fluids together in prescribed relative proportions and to a predetermined total volume. The present invention more particularly concerns post-mix soft drink dispensers for mixing together and dispensing carbonated water and flavored soft drink syrup in a prescribed mix ratio until a predetermined volume, typically one serving portion, has been dispensed.

2. Background of the Invention

Soft drinks are typically made by mixing a special syrup, produced by the drink manufacturers, with carbonated water. This mixing may transpire in canning and/or bottling facilities, or in post-mix soft drink dispensers at the point of sale. Post-mix soft drink dispensers typically inject the water and syrup simultaneously into a mixing chamber where they are mixed together. The mixed fluids are then dispensed through a nozzle into a drinking cup. The two fluids are normally supplied for coextensive time durations, and the mix ratio has typically been controlled using manually-adjustable metering pins.

To keep the quality of the mixed drinks at the desired level the syrup and water have to be mixed with a very high degree of accuracy. Syrup is desirably mixed with water in an exactly predetermined proportion, typically in the range from 1/7 to $\frac{1}{5}$. Syrup manufacturers, and sellers of soft drinks, believe that the accuracy of the mixing, or "brix", should desirably be not worse than ±1%. Variations from the desired mix accuracy result in uneconomical use of the syrup component, and undesirable variations in the quality of the mixed drink product.

The desired mixing precision has not yet been achieved in post-mix soft drink dispensers. One source of error in mixing precision is due to variations in the absolute, and relative, pressures of the syrup and of the water during the period of dispensing operation, and between dispensing periods. These pressure changes tend to alter the flow rate of the syrup and/or the water, and of the syrup relative to the water. These changed flow rates in turn change the mixing, or "brix" of the beverage.

There are a number of previous soft drink dispensers that attempt to maintain a fixed mix ratio by manually adjusting a flow control metering pins in the syrup and water supply lines. The adjustment procedure is time consuming and cumbersome. A special container called a "standard measuring cup" is employed. The standard measuring cup has two reservoirs calibrated by a single scale, typically two vertical cylinders with a centrally-located scale. The volumes of the two reservoirs per scale unit of fill are in a fixed proportion, for example five to one (5:1). A soft drink dispenser is disassembled to a level which permits the syrup and water output flows to be separated. Each flow is plumbed into a corresponding reservoir of the standard measuring cup. The flows are adjusted to be in proper proportion in consideration of the observed filling of the standard measuring cup, normally by adjustment of the flow control metering pins. The procedure must be periodically reperformed in order to account for any long term changes in the pressures or viscosities of the dispensed fluid. Short term variations in flow rates during a single dispensing operation, or between individual dispensing operations, cannot be accounted for by periodic manual adjustments.

Soft drink dispensers that are automated for the adjustment of fluid flow rates exist. Many of these previous dispensers are complex. Most still require substantial manual adjustment when changing from one type of syrup to another. However, some previous flow-controlled dispensers are based on components as simple as a flow washer.

A flow washer is an annular ring, or washer, that is made of a flexible material. It is positioned in-line a bore flowing fluid. The flow washer typically presents a portion of a spheroidal surface having its convex side disposed upstream when the flow washer is positioned within the bore. Variations in fluid flow rate cause the flow washer to flex, thereby enlarging or constricting its central aperture.

Although much more expensive, and complex, flow regulation devices exist, flow washers are reasonably effective in precisely controlling flow rates over that range of pressures which are commonly experienced during beverage dispensing operations. If fluid pressure variations were the only source of corresponding variations in the relative proportions of dispensed water and syrup, then a mixing accuracy of ±1% could seemingly be achieved by existing flow-controlled beverage dispensing devices and systems.

Unfortunately, there is another, highly significant, factor contributing to variations in the accuracy of the mixing, or "brix", transpiring within post-mix soft drink dispensers. This factor is the change in the fluid friction, or fluid viscosity, of the mixed fluids. The syrup, in particular, has a viscosity that exhibits a very high dependance on temperature, and that undergoes significant changes during the normal environmental temperature variations that attend post-mix soft drink dispensing. When the fluid friction, or viscosity, of either fluid component changes then an equal pressure will cause a different amount of that fluid component to flow along the same path, thereby changing the relative proportions of the dispensed fluids. The carbonated water is generally less sensitive than the syrup to viscosity variations with temperature changes than is the water, thereby aggravating the problem of dispensing both syrup and water together in a precisely prescribed mix ratio over a range of temperatures, and over a corresponding range fluid viscosities.

Some soft drink dispensing systems attempt to measure fluid flow rates with flowmeters in order to adjust the flow rates, and to maintain them in a prescribed ratio. Unfortunately, the same fluid viscosity variations that cause problems with flow washer control of fluid flow also cause problems with flowmeters. Syrups can commonly vary in viscosity from ×2 to ×20 over the range between 32° F. (0° C.) and 194° F. (90° C.). These large variations cause commensurate variations in the signal outputs of previous viscosity-sensitive flowmeters. Previous systems dependent upon such viscosity-sensitive flowmeters for regulating fluid flow to dispense a (i) prescribed mix ratio and/or (ii) predetermined volume are correspondingly subject to undesirable error.

One previous system dealing with the full complexity of reliably providing accurate relative proportions of fluids despite variations in fluid pressure and/or fluid viscosity is shown in U.S. Pat. Ser. No. 4,487,333 for a FLUID DISPENSING SYSTEM. This fluid dispensing system employs syrup and water flowmeters in order to monitor the instantaneous flow rates of both the water and of the fluid. Responsively to this monitoring, separate syrup and water valves are controllably turned on and off, each independently at an appropriate duty cycle, in order to provide a prescribed mix ratio. The sensed, and controlled, fluid flow is directed to minimizing the effects of any pressure variations in the syrup and water supplies on the dispensing of the water and syrup in accurate and constant proportion.

However, the flowmeters of the previous fluid dispensing system are sensitive to changes in the viscosity of the fluid for which flow is sensed. The previous fluid dispensing system attempts to accommodate variations in the relative proportion of the water and syrup mix that are induced by changes in viscosity. In order to do so, a temperature sensor is used to sense the temperature of the syrup (that component of the mix that incurs the greatest changes in viscosity due to changes in temperature). A microprocessor-based electronics control circuit receives this sensed temperature, as well as the sensed flow rate. The control circuit references a separate, removable, personality module for each type of syrup. The module contains information on both the prescribed mix ratio for that particular syrup and the dependence of the syrup viscosity on changes in temperature. The control circuit uses this information to calculate the appropriate duty cycles that will control for pressure variations, and also for viscosity variations, in the dispensed syrup component.

The previous fluid dispensing system is obviously complex and expensive. It performs any one dispensing task on the basis of laboratory information contained within the removable personality module This information regards both the desired mix ratio and the viscosity characteristics of the syrup component. The personality module and its information contents must be customized for each individual type of syrup—an impossible task.

Moreover, the advanced fluid dispensing system of U.S. Pat. Ser. No. 4,487,333 attempts to effect fluid flow control by cycling a solenoid valve on and off at a variable duty cycle. The cycling induce noise and vibration. An induced hammering effect is detrimental to plumbing. A solenoid valve is typically a two-stated, on or off, device and is ill adapted for flow control.

In another matter, one known method determining the total amount of mixed fluids dispensed has been to enable fluids flows for a preset period of time. Because the total volume of mixed fluid dispensed is dependent upon the rates of the fluids' flows, the flow rates must be precisely controlled to be of a predetermined magnitude, or must at least be precisely known. Any variation in the predetermined flow, or measured flow, magnitude of either or both fluids results in an undesirable deviation in the volume of mixed fluids that is dispensed.

According to these limitations of previous fluid dispensing systems, it would be desirable that a fluid dispensing system, particularly for the post-mix dispensing of soft drinks, should operate to mix together and dispense two fluids at a prescribed mix ratio regardless of variations in the fluid pressure of either or both fluids, and regardless of variations in the viscosities of either or both fluids. The dispensing system would desirably function accurately with all syrups regardless of their differing viscosities and regardless of changes in viscosity with changes in temperature. The system would desirably maintain the predetermined mix ratio of both fluids continuously throughout the dispensing process in order that an excess of one fluid, or the other, would not have to be added to the dispensed drink at the last in order to establish the desired overall mix ratio.

It would be desirable that the mix ratio should be readily and easily specifiable—including at non-integer, or at slightly stronger or slightly weaker, ratios as the situation dictates—by the same personnel that otherwise and elsetimes use the post-mix dispenser to dispense soft drinks.

It would also be desirable if these unskilled personnel could readily and conveniently specify the volume of soft drink dispensed, including at volumes that do not represent an integer number of volume units and that may be, as the situation dictates, of a slightly greater or slightly lesser volume than is normally used to fill each one of a number of standard containers.

Finally, the fluid dispensing system accomplishing all this precise and readily conveniently specifiable control would desirably be inexpensive, reliable in operation, and essentially free of any requirements for alignment, adjustment, or scheduled maintenance.

SUMMARY OF THE INVENTION

The present invention contemplates a fluid dispensing system, normally one that mixes precisely two fluids together in prescribed relative proportion, that is (i) insensitive to variations in the fluid pressure or the fluid viscosity of either or both fluids, (ii) continuous and constant in its regulation of fluids' flows so that no deviation from a prescribed mix ratio ever occurs, even instantaneously, (iii) conveniently adjustable in the ratio of fluids dispensed, (iv) highly accurate to dispense a predetermined volume of mixed fluids, (v) conveniently user-programmable over an infinite range of predetermined dispensed volumes, and (vi) capable of keeping records the fluid volumes and portions dispensed.

In accordance with one aspect of the present invention, the flow rate of each fluid component that is subject to viscosity changes, for example the flow rate of the syrup component within a post-mix soft drink dispenser, is sensed by a flowmeter that is substantially insensitive to variations in fluid viscosity. The flow rate of any fluid that does not undergo substantial changes in viscosity, for example the carbonated water in a post-mix soft drink dispenser, (i) may be sensed by a viscosity-insensitive flowmeter, (ii) may be sensed by a conventional-type flowmeter, or, (iii) may not be sensed at all and may be, instead, regulated to be at a predetermined rate regardless of pressure variations, preferably by use of a simple and inexpensive flow washer.

The pressure-sensing function is performed by a differential pressure sensor that is substantially insensitive to fluid frictional forces, and to changes in fluid viscosity. Its variable-channel-area-occluding function is performed by a flow obstructor, connected to the pressure sensor for moving therewith, that is substantially sensitive to fluid frictional forces, and to changes in these forces due to changes in fluid viscosity. The ratio of the pressure force exerted on the differential pressure sensor to the fluid frictional forces exerted on the flow obstructor approximately equals the ratio of the area of the pressure sensor to the area of the flow obstructor.

This ratio is made very small, typically less than 1%. The flowmeter accordingly exhibits substantial insensitivity to changes in fluid friction due to changes in fluid viscosity.

An electronic circuit operates on the signals produced by the one or more flowmeters in order to regulate the corresponding one or more fluid flows, and to maintain such flows in the prescribed relative proportion.

In accordance with another aspect of the present invention, maintenance of the fluid flows in the prescribed relative proportion is continuous and constant. No flow control valve or valves are cycled on and off so as to produce pulses, or squirts, of one fluid or another. Neither is any flow started before, or prolonged after, any other flow so as to produce a preliminary, or subsequent, dollop of one liquid or another. Both liquids are constantly and continuously dispensed in the prescribed relative proportion from the beginning to the end of any dispensing operation, howsoever long or short in time or large or small in volume.

The continuous and constant maintenance of the fluid flows in the prescribed relative proportion is realized by (i) continuously operating flowmeters, (ii) a continuously operating control circuit, and (iii) an electronically controllable flow regular that are continuously variably adjustable to regulate fluid flow. The (iii) electronically controllable flow regulator is preferably a motorized metering pin.

In accordance with still another aspect of the present invention, the electronic control circuit, which is typically based on simple analog amplifiers but which may alternatively be based upon a microprocessor, is infinitely adjustable in the ratio of the fluids dispensed. The ratio is typically adjusted by adjusting the relative gain between two amplifiers. Each amplifier is responsive to the detected flow rate of an associated fluid to control a motorized metering pin in order to regulate the flow of an associated fluid. The gain adjustment requires no electrical test equipments, and is simply accomplished with a screwdriver in response to visual observation of fluid flow.

In accordance with still another aspect of the present invention, a predetermined mixed volume of two fluids is dispensed by integrating in real time the fluid flow of each fluid.

A dispenser apparatus so integrating actual fluid flows to the sum of a predetermined volume may be, in accordance with still another aspect of the present invention, conveniently programmed to dispense any desired volume. In one particularly simple and convenient preprogramming process, the operator causes the fluid dispenser to continuously flow fluid by manually demarking the beginning and the end of a time interval during which the desired volume of flowed fluid is accumulated. The dispenser calculates by integration the precise amount of fluid, which need not be an arbitrary number of fluid volume units, that was flowed during the manually-demarked time interval. Thereafter during use for dispensing the dispenser will dispense precisely this preselected volume of mixture.

In accordance with still yet another aspect of the present invention, a fluid dispenser based on a programmable microcontroller keeps a log of (i) all portions served by type and by total volume for that portion type, (ii) a grand total of the number of all types of portions that are dispensed, and (iii) the cumulative volume of all such portions. This information may normally be initialized, accessed, and/or changed only by a person having appropriate knowledge and/or control entry codes. An owner of a beverage dispensing machine may thereby compare the total activity reported by the machine to the business receipts realized from the sale of products dispensed by the machine.

These and other attributes and aspects of the present invention will become increasingly clear on reference to the following specification and accompanying drawings.

BRIEF DESCRIPTION OF THE DRAWINGS

FIG. 1 is a perspective view, partially in cutaway, of a prior art post-mix soft drink dispenser.

FIG. 2 is a perspective view, partially in cutaway, of a post-mix soft drink dispenser in accordance with the present invention.

FIG. 4b is a perspective view of a component of the viscosity-insensitive flowmeter shown in FIG. 4a.

FIG. 5a is a cutaway plan view of a prior art flow washer in its deployed position interior to a conduit flowing fluid.

FIG. 5b is a perspective view of a prior art flow washer.

DESCRIPTION OF THE PREFERRED EMBODIMENT

A perspective view of a post-mix soft drink dispenser 1 is shown in FIG. 1. An equivalent diagrammatic view of a post-mix soft drink dispenser 10 in accordance with the present invention is shown in FIG. 2. The dispenser 10, having its control section 20 shown in cutaway view, is substantially physically indistinguishable from the prior art dispenser 1 shown in FIG. 1. Indeed, the control systems and methods of present invention are readily retrofittable to existing post-mix soft drink dispensers.

During the course of retrofitting a dispenser 1 to become a dispenser 10 in accordance with the invention, some existing components will have an altered, or a diminished, functional role. Some of the altered components will appear physically similar to existing components. Still other components used in the dispenser 10 in accordance with the present invention are new, and are not present within prior art soft drink dispensers. These new components are generally (but not necessarily) located exterior to control section 20 and dispenser 10, and are thus not shown in FIG. 2.

Figure 3:
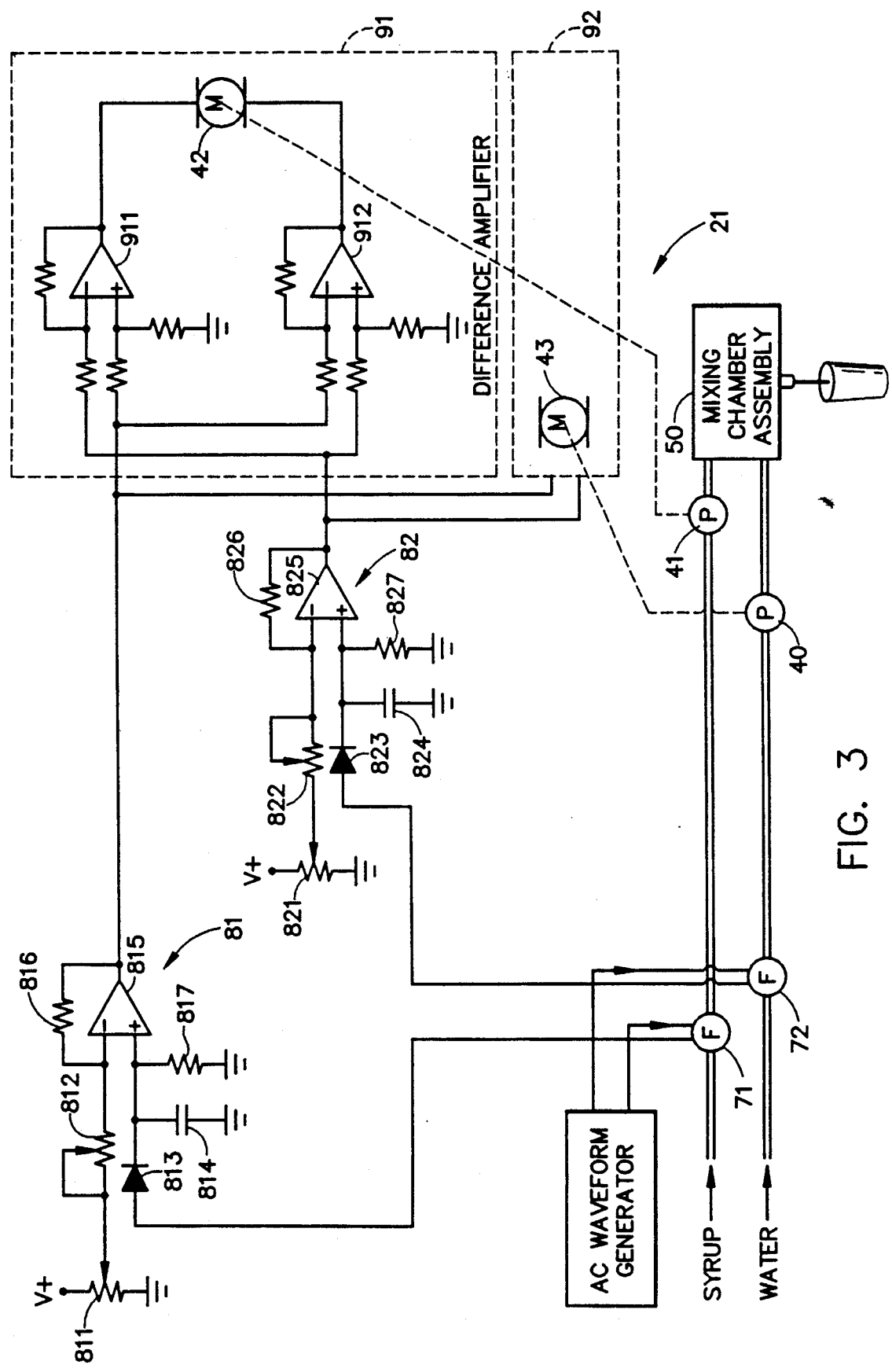
FIG. 3 is a block diagram of a post-mix soft drink dispenser in accordance with the present invention for mixing together carbonated water and soft drink syrup in a prescribed mix ratio.
Figure 6:
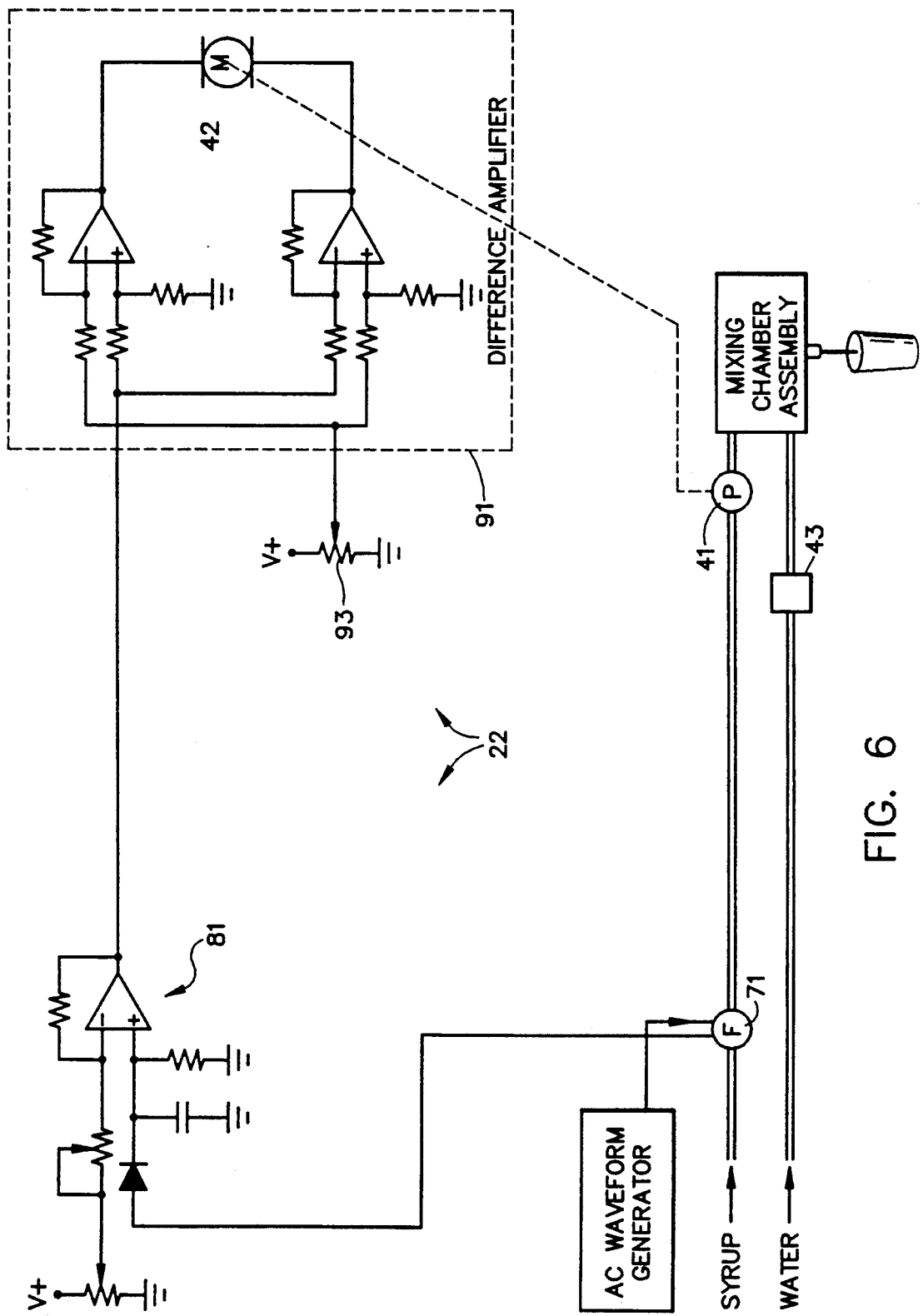
FIG. 6 is a block diagram of a second embodiment of a post-mix soft drink dispenser in accordance with the present invention.
Figure 7:
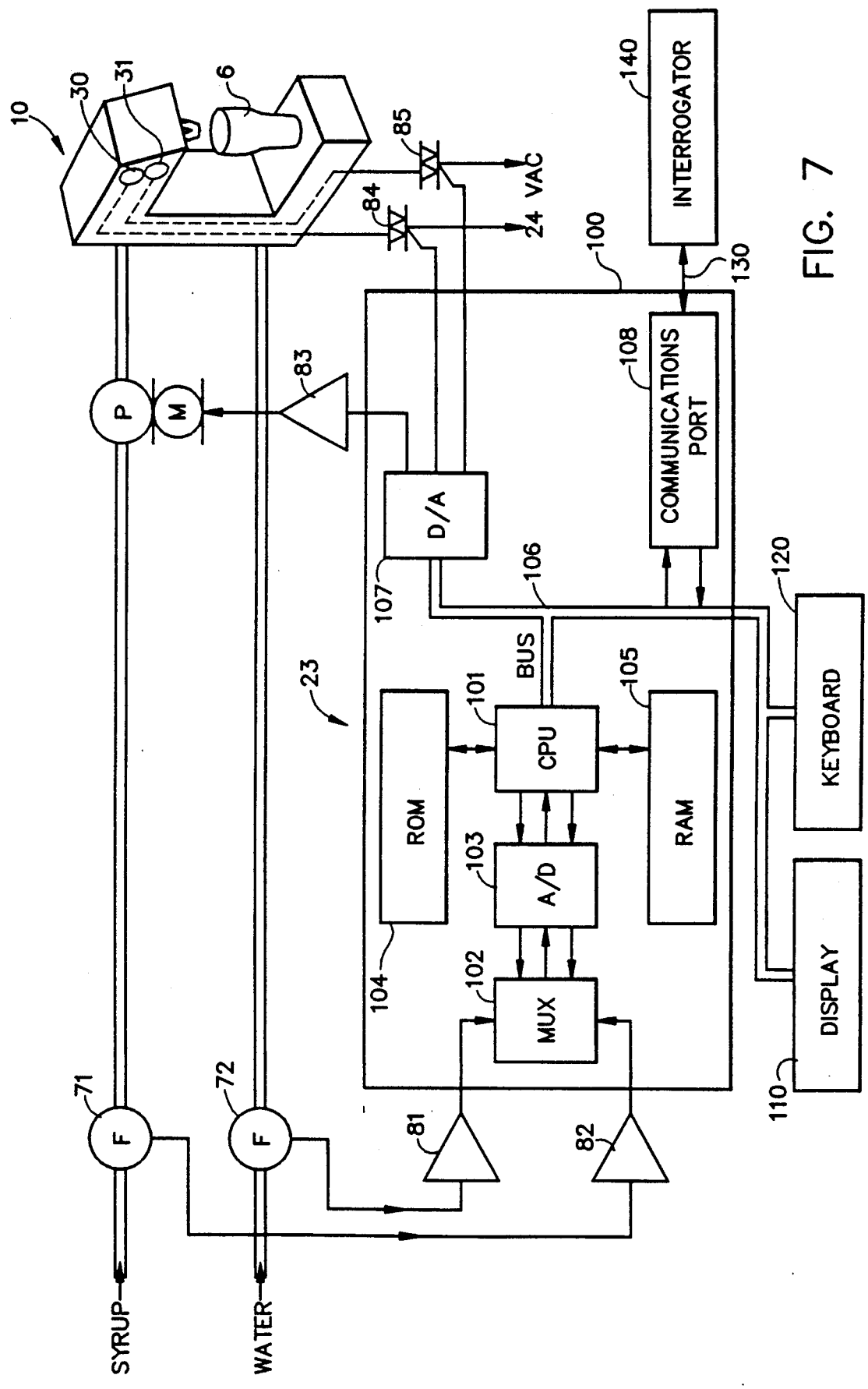
FIG. 7 is a block diagram of a third embodiment of a post-mix soft drink dispenser in accordance with the present invention.

The best understanding of the dispenser 1 in accordance with the present invention will be derived from block diagrams of its three major embodiments within FIGS. 3, 6, and 7. FIG. 2 is shown, however, as a general illustration of the environment of the invention.

In a traditional soft drink dispensing apparatus shown in FIG. 1 two solenoids valves 3 enable and disable the flow of syrup concentrate and carbonated water. Two metering pins 4 are adjustable to crudely control the syrup and water flow rates, and to preset the mix ratio of the soft drink beverage dispensed from nozzle 5 into glass 6.

In the dispenser 10 in accordance with the present invention solenoid valves 30, 31 are electrically controlled to enable or disable the respective flow of syrup and carbonated water. If the dispensing apparatus and method of the present invention is retrofitted to an existing soft drink dispenser, the existing solenoid valves 3 thereof continue to be used. In these embodiments of the invention block-diagrammed in FIGS. 3 and 6 the solenoid valves 30, 31 will continue to be controlled by the manually-activated switches (not shown) that actuate the dispensing of soft drink. In the embodiment of the invention block-diagrammed in FIG. 7 the solenoid valves 30, 31 will be enabled and disabled by a control circuit.

In retrofitting the control system and methods of the present invention to the prior art soft drink dispenser 1 the metering pins 4 are sometimes not susceptible of being modified for the purpose of being powered in their operation. In such a case the metering pins 4 are not used. These metering pins 4 are typically backed off completely in order to open the corresponding syrup and water channels, and are thereafter not involved in the soft drink dispensing operation. In this case the motorized metering pins 40, 43 and 41, 42 variously shown in FIGS. 3, 6 or 7 are new, and are typically physically located outside of control section 2 to soft drink dispenser 10.

Conversely, if the metering pins 4 within the prior art dispensing apparatus 1 are suitably modified so as to be powered, they may then serve as the variably controllable flow regulators 40, 41 within the dispenser apparatus 10 in accordance with the present invention. In this case the elements 4 become the flow regulators 40, 41 by motorizing the metering pins 4 of dispenser 1 with motors 42, 43, making thereby motorized needle valves. When the system of the present invention is retrofitted so as to fit within the existing physical structure of a previous soft drink dispenser, the motorized flow regulators 40, 41 take the place of the mechanical metering pins 4 that they replace.

A block diagram of a first embodiment of the control circuit 21 of soft drink dispenser 10, previously seen in FIG. 1, is shown in FIG. 2. The first embodiment of the control circuit 21 controllably adjusts both a water metering pin 40, and a syrup metering pin 41, to a controllable extent so that the dispenser 10 dispenses soft drink syrup and water at a prescribed mix ratio.'

The water metering pin 40, and the syrup metering pin 41 are so numerically designated relative to the solenoid valves 3 and the metering pins 4 shown in FIG. 1 because the first embodiment control circuit shown in FIG. 21 preferably implements such metering pins 40, 41 at the physical sites of metering pins 4 shown in FIG. 1. It will be recognized that the metering pins 40, 41 could be implemented in the syrup and water supply lines external to soft drink dispenser 10 and control area 20 thereof. Full opening and full closing solenoid valves 30, 31 (shown in FIG. 2) remain connected to an independent source of control for determining the amount of liquid dispensed. This source of control may be, for example, a manually operated electrical switch (not shown) which causes the solenoid valves 3 to remain open for such time as the switch is depressed. This control may be, alternatively, a time delay circuit (not shown) which causes the solenoid valves 3 to remain open for a set time after a switch is first depressed.

Accordingly, the portion measurement function of the dispenser 10 is not part of the first embodiment of the control circuit 21 shown in FIG. 2, which is directed only to providing the prescribed mix ratio. The reasons why the ratio control provided by control circuit 21 is isolated from remaining control of the dispensed portion, which may also be based on electrical circuits, transpiring within dispenser 10 are twofold. First, it is important to understand that the mix ratio control implemented by the control circuit 21 is not incompatible with the existing control, nor with the physical structure, of existing soft drink dispensers. Accordingly, the circuit 21 is susceptible of being retrofitted to such existing soft drink dispensers. It may be so retrofitted either interior or exterior to soft drink dispenser 10 and to the control area 20 thereof. Second, the first embodiment of the control circuit 21, and also the second embodiment of the control circuit 22 to be shown in FIG. 6, are entirely analog, and do not contain that microcontroller and its associated analog-to-digital conversion circuit that is employed in the third embodiment of the control circuit 23 to be shown in FIG. 7. Correspondingly these embodiments of the control circuits are electrically quite simple.

Referencing FIG. 2, the flows of syrup and water are respectively sensed by viscosity-insensitive flowmeters 71, 72. These viscosity-insensitive flowmeters 71, 72 are of novel construction. They are taught in copending U.S. patent application Ser. No. 329,433 filed on Mar. 13, 1989 to the same Michael Tentler that is the inventor of the present invention, and assigned to the same assignee. The content of that patent application is incorporated herein by reference.

Figure 4A:
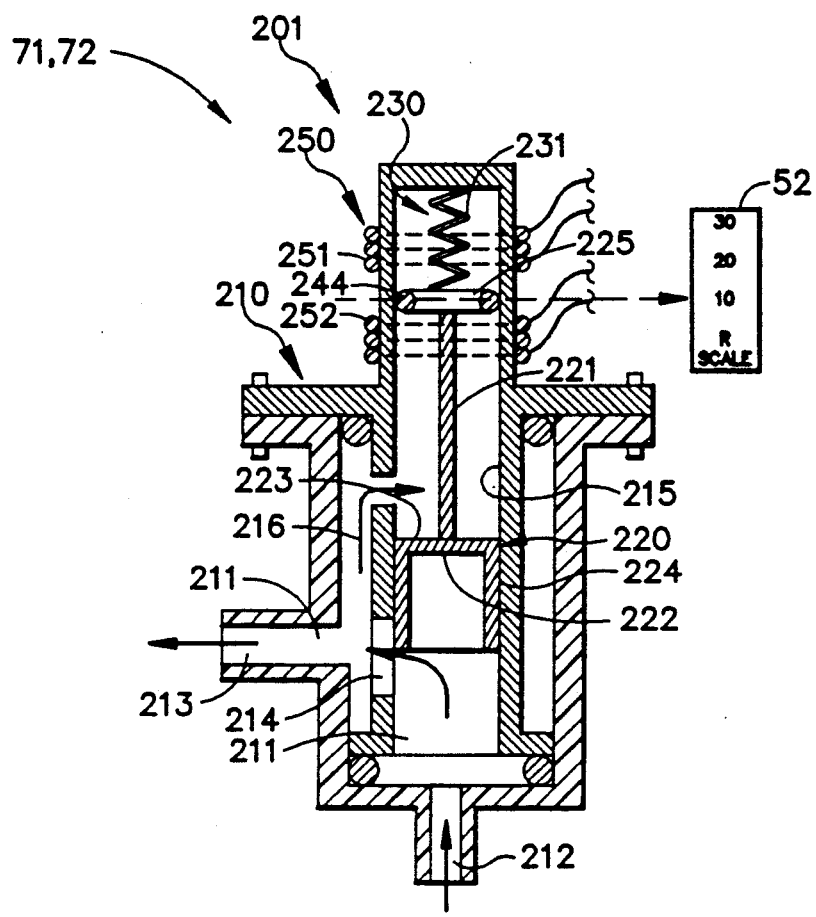
FIG. 4a is a cutaway plan view of one embodiment of a viscosity-insensitive flowmeter used in the soft drink dispenser in accordance with the present invention.
Figure 4B:
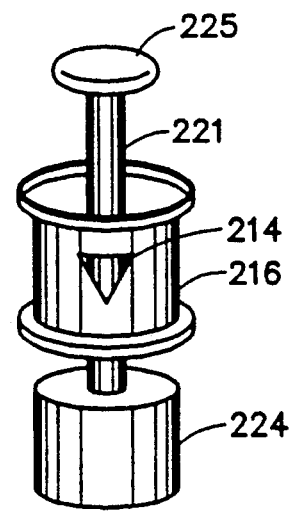

In order to better understand the operation of viscosity-insensitive flowmeters 71, 72, and in order to make the present application more complete, one preferred embodiment of such flowmeters 71, 72 is shown in FIG. 4, consisting of FIG. 4a and FIG. 4b. A housing 210 defines a channel 211 between an upstream location 212 and a downstream location 213. Between the upstream location 212 and the downstream location 213 there is an aperture 214 which may be variably occluded, in a manner to be explained, so as to obstruct the flow of fluid within the channel 211.

A differential pressure sensor 220 is embodied in a plunger 220 that is shown in perspective view in FIG. 4b. The plunger 220 moves in a cavity 215, normally a cylindrical bore, of housing 210. The distal end region 222 of the plunger 220 is exposed to the upstream fluid pressure of upstream location 212. The fluid pressure at downstream location 213 is ported via aperture 216 of housing 210 to the opposite, proximal end side 223, of plunger 220. The differential pressure seen between the distal end surface 222 and the proximal end surface 223 of plunger 221 causes it to move against the force of a force biasing means 230, typically a spring 231, within the cavity 215 of housing 210.

Although the force biasing means 230 is illustrated to be a spring 231, it is possible to perform this force biasing by gravitational force on the mass of plunger 220 when it is oriented in a substantially vertical orientation of housing 210.

The flange 224 of plunger 220 is interoperative with the aperture 214 within sleeve portion 216 of housing 210 to variably occlude the flow of liquid within the channel 211. In FIG. 4b it is illustrated that the aperture 214 is within the sleeve portion 216 of the housing 210. The flange 224 of plunger 220 operates to variably occlude this aperture. Conversely, it will be understood that an aperture could have been positioned within the flange 224 to the plunger 220 which could be interoperative with a larger aperture within the sleeve region 216 of housing 210 to equivalently obstruct the fluid flow within channel 211.

The aperture 214 within housing 210, or its alternative equivalent within the flange 224 of plunger 220, is preferably triangular in shape. This particular shape provides that the cross-section of the area of channel 211 at the location of aperture 214 will be proportional to the square of the movement of plunger 220. Because the pressure differential is proportional to the square of the flow for a given cross-sectional area, the displacement of plunger 220 is linearly proportional to the flow rate.

It should be understood that aperture 214 could assume other shapes than that of an equilateral triangle. If, for example, the aperture was a simple rectangle or square, then the change of flow cross-sectional area would be linear with movement. This would mean that the displacement of plunger 220 would be proportional to the square of the flow rate. A triangle of nonequilateral shape, or other, complex, shapes for aperture 214 could be envisioned. Generally, it is possible to create an aperture 214 so that the movement m of the plunger equals any desired function of flow, $m = F(flow)$. Likewise, the change of flow cross-sectional area can be made to be any desired function of the opening, opening area OA, $OA = G(f(flow))$. Finally, the pressure differential P is proportional to the square of the flow for a given cross-sectional area. Therefore $P = G(f(flow))^2$.

Generally, the variable-area flowmeter 71, 72 is linearly indicating. The linear movement of flange 224 to plunger 220 causes an identical movement of the proximal end extension of plunger 220 by action of shaft 221. Such indication may be visual by viewing the location of the proximal end extension 225 to plunger 220, including its location relative to scale 52. Such indication may be electrical by sensing the position of electrically conductive element 244, typically a simple copper loop, by external inductive coil 250. The energization of upper and lower segments 251, 252 of electrical coil 250 is normally with an alternating current. Such an arrangement implements the well-known linear displacement transducer.

Importantly to the present invention, the flowmeter 71, 72 is substantially insensitive to fluid friction, and to changes in fluid friction due to changes in fluid viscosity, in its operation. The plunger 220, which serves as the differential pressure sensor, moves in a direction that is substantially perpendicular to the fluid flow within channel 211 of housing 210. By the laws of mechanics, this movement cannot couple, or be sensitive to, those fluid frictional forces that occur substantially transversely to be longitudinal, movement, axis of plunger 220. Meanwhile, the fluid flow through aperture 214, and at the flange 224 of plunger 220 does tend to impart a force, due to fluid resistance, to the movement of plunger 220.

In the flowmeter 71, 72 the pressure force on plunger 220 is in a ratio to the fluid frictional force on plunger 220 (at its flange 224) substantially as the area of plunger 220 is in a ratio to the area of aperture 214 (at the counterpart regions of flange 224 to such aperture 214). The area of plunger 220 is normally made large relative to the area of aperture 214, normally in a ratio of the order of 100:1. A flowmeter, 71, 72 so constructed will be demonstrably accurate to ±1% despite variations in fluid viscosity on the order of times twenty (×20).

Returning to FIG. 3, the syrup and water flow rate signals respectively developed at viscosity-insensitive flowmeters 71 and 72 are respectively amplified in the syrup flow signal amplifier 81 and the water flow signal amplifier 82. Each of the amplifiers 81, 82 has an adjustable offset established by variable resistors 811, 821 of typical value 10 kilohms. Each of the amplifiers 81, 82 has a variable gain established by the variable resistors 812, 822 of typical value 10 kilohms. The amplifiers 81, 82 are respectively diode isolated by diodes 813, 823, typically types 1N914 and alternating current noise is filtered by capacitors 814, 824 are typically value 1 microfarads. Operational amplifiers 815, 825 are typically type LM324 and are biased in operation by bias resistors 816, 826 and 817, 827 all of typical value 10 kilohms.

The adjustable offset resistors 811, 821 permit, in conjunct, that the syrup flow signal amplifier 81 and the water flow signal amplifier 82 may be adjusted to provide equal output signal strengths when the respective syrup and water flows detected by flowmeters 71 and 72 are at a broad range of allowable ratios relative to each other. The syrup flow signal amplifier 81 and the water signal amplifier 82 may typically be adjusted to provide equal output signals when the detected syrup and water flows are at ratios within the range from 1:1 to 10:1. The ratio between detected syrup and water flows that produce equal signal outputs need not be in integer ratio and can be, for example, a ratio like $\sqrt{2}:1$. Note that any intrinsic difference in the signal levels resultant from viscosity-insensitive flowmeters 71, 72 in the detection of an equal fluid flow rate may be compensated for by the offset within amplifiers 81, 82. Similarly, it is not required that the syrup and the water should flow through pipes of equal diameter.

The signal outputs from the syrup flow signal amplifier 81 and the water flow signal amplifier 82 are received, in parallel, at difference amplifiers 91, 92. The difference amplifier 91 is formed from appropriately-resistor biased operational amplifiers 911, 912, typically types LM324. The difference amplifier 92 is formed equivalently. The combined signal outputs of the operational amplifiers of the difference amplifiers 91, 92 respectively drive d.c. motors 913, 923. The motors 913, 923 are respectively mechanically linked to metering pins 40, 41.

The motors 913, 923 operate to rotate the metering pins 40, 440 so that the flow rate signals produced by flowmeters 71, 72 as amplified in amplifiers 81, 82 will be equal, meaning that the amplified signals will not be quantatively different. At this time the flow of syrup and water to the mixing chamber assembly 50 will be at the prescribed, predetermined, mix ratio.

The responsiveness of the motors 913, 923 and the metering pins 40, 41 controlled thereby to variations in fluid flow detected by flowmeters 71, 72 may be adjusted by setting the gain of amplifiers 81, 82 respectively at variable resistors 812, 822. Normally the gain of the amplifiers 81, 82 is set so that the motorized metering pins 40, 41 respond promptly to all detected variations, but do not chatter in response to uneliminatable mechanical and electronic noise in the first embodiment of the control circuit 21.

It will be understood that any electronically controllable flow regulator could be controlled by the control circuit 21, and by counterpart control circuits 22 and 23 respectively shown in FIGS. 6 and 7. The motorized metering pins 40, 41 are preferred as electronically controllable flow regulators because of their proven suitability to beverage dispensing.

A second embodiment of a control circuit of a postmix soft drink dispenser in accordance with the present invention is shown in FIG. 6. The control circuit 22 shown in FIG. 6 is a simplification of the first embodiment of the control circuit 21 shown in FIG. 3. The flowmeter 72, difference amplifier 92, and metering pin 40 of the first embodiment (shown in FIG. 3) are replaced with a mechanical flow regulator 43. This flow regulator 43 in the water feed line is preferably a prior art flow washer, as illustrated in FIG. 5, consisting FIG. 5a and FIG. 5b.

The flow washer 43 shown in FIG. 5 is in the form of a annular ring, or washer. It is made of a flexible material, typically plastic or rubber. The flow washer 43 is positioned within a bore flowing fluid, as illustrated in FIG. 5a. It is typically disposed within the bore so as to present a portion of a spheroidal surface with its convex side disposed upstream. Variations in fluid flow cause the flow washer 43 to flex, thereby enlarging or constricting its central aperture. This flexure serves to variously constrict, or enable, fluid flow in accordance that the fluid pressure is respectively higher or lower. The aggregate effect is to maintain the net fluid flow rate approximately constant for a range of fluid pressures.

In a second embodiment of a control circuit 22 for a soft drink dispenser 10 in accordance with the present invention, the flow washer 43 is used within the water feed line. The water in this line is not substantially subject to viscosity variations with changes in temperature. Its pressure, may however, vary over a range, typically 3620 to 6202 mm Hg (70 to 120 pounds per square inch) in accordance with normal short and long term variations in the water supply. The flow regulator 43 in the form of a flow washer serves to accommodate for these variations, and to maintain the rate of water flow to be approximately constant at all times.

Meanwhile, a signal derived from viscosity-insensitive flowmeter 71 located in the syrup line is processed in syrup flow signal amplifier 81 and compared to a reference voltage derived from resistive voltage tap 93 in difference amplifier 91. A signal reflecting the difference between the detected, and desired, syrup flow rate is developed to drive motor 42 which is mechanically linked to metering pin 41. The rate of fluid flow is accordingly constantly and continuously held at a predetermined level despite variations in the pressure and/or the viscosity of the syrup.

The second embodiment of the control circuit 22 shown in FIG. 6 is not preferred over the first embodiment shown in FIG. 3, or the second embodiment to be shown in FIG. 7, for generally being less accurate than these other embodiments. Despite its extremely simple construction, the second embodiment of the control circuit 22 will, however, generally control that fluids will be mixed in a prescribed mix ratio more accurately than such control is accomplished by prior circuits.

Moreover, this control is substantially unaffected by variations in pressure and/or viscosity of the syrup component, or by normal variations in the pressure of the water component.

A third embodiment of a control circuit 23 of a soft drink dispenser 10 in accordance with the present invention is block diagrammed in FIG. 7. The control circuit 23 is digital, and is substantially based entirely upon integrated circuit device 100, typically a microcontroller series 80C 51 available from Intel Corporation. The flow rate of syrup and water are respectively sensed by viscosity-insensitive flowmeter 71 and 72. The signal outputs from the flowmeter 71, 72 are respectively amplified in amplifiers 81 and 82, typically type LM324 available from National Semiconductor. The amplified flow rate signals are each communicated to central processing unit CPU 101 through analog multiplexer MUX 102 and analog to digital converter A/D 103 at different times within device 100. The central processor unit CPU 101 runs a firmware program that is stored in read only memory ROM 104. Data quantities developed and used during execution of the firmware program are stored in random access memory RAM 105. The central processor unit CPU 101 communicates via a bus 106 to digital to analog converter D/A 107. The analog signal output from digital to analog converter D/A 107 is amplified in power amplifier 83, typically type CS365 manufactured by Cherry Semiconductor, Inc., to drive motor 42 and metering pin 41. The firmware program executed by device 100 is directed to, among other things, regulate the flow of syrup by control of metering pin 41 so that it is in a predetermined prescribed relative proportion to the flow of water.

The firmware program executed by device 100 also calculates the volume of the flow of each of the syrup and the water and the combined volumes. The flowmeter 71 senses the flow rate $I_S(t)$ of the water. The flowmeter 72 senses the flow rate $I_W(t)$ of the water. Both flow rates $I_S(t)$, $I_W(t)$ are in terms of units fluid per unit time. The device 100 is responsive to the flowmeters 71, 72 for computing in real time t over an elapsed time T a measured volume V of total fluid flow:

$$V = \int_O^T [I_S(t) + I_W(t)] dt$$

The units of the fluid flow, and the units of the integrated volume, are completely arbitrary. The units of flow measurement are based on the clock speed of the device 100, and on the firmware-controlled frequency at which flowmeters 71, 72 are sampled.

The device 100 also produces signals at a time T when the measured volume V equals a predetermined volume $v_p$. These signals, converted to analog form in digital-to-analog converter D/A 107, are amplified in TRIACs 84, 85 and are respectively used to close solenoid valves 30, 31. Closure of the solenoid valves 30, 31 disables the flow of both the syrup and the water at such time T as the predetermined volume $V_p$ has been measured.

The discrete control of the water and syrup flows permits the suspension, at any desired time and in response to any desired occurrence, the flow of either the syrup or the water. Meanwhile, the computation of the measured volume V of total fluid flow continues. The device 100 is directable to suspend the flow of one fluid or the other (and to thereby cease to maintain the flows in the prescribed ratio) from keyboard 120. The volume of each individual fluid flow may be measured after a long interval, for example several minutes. The volumes can be compared as an indication of the dispensing accuracy of dispenser 10, and control circuit 23. The accuracy is typically less than ±1% under conditions of variation in the viscosity of either water or syrup in the range of ×2 to ×20.

The central processor unit CPU 101 within device 100 also communicates via communications BUS 106 with DISPLAY 110 and KEYBOARD 120. The DISPLAY 110, typically of the light emitting diode type, shows the operational status of the control circuit 23, and the dispenser 10, during its use for dispensing beverages. The KEYBOARD 120 is used to program control parameters, such as the desired prescribed ratio of fluid components, into the device 100. During the programming of the system the display 110 will commonly show the entered data quantities, as is routine for the programming and control of digital systems.

The central processor unit CPU 101 executing the firmware control program also communicates via bus 106 with a COMMUNICATIONS PORT 108. The COMMUNICATIONS PORT 108 communicates externally to device 100 via channel 130, typically of the RS 232C type, to an external INTERROGATOR 140. The INTERROGATOR 140 is normally another active, program, digital device and may be, for example, a portable personal computer. The INTERROGATOR 140 communicates with the central processor unit CPU 101 and the firmware program running within device 100 to control certain aspects of the device 100 operation and/or to initialize certain of the data stored in device 100 in a manner not usually accomplishable via KEYBOARD 120.

In particular, the INTERROGATOR 140 may normally initialize certain historical records that are maintained by the firmware program operative within device 100. These records may include, for example, a record of the numbers of individual portions of different sizes that are dispensed, the total fluid ounces of mixture that are dispensed for each size portion, and the grand total fluid ounces of mixture that are dispensed for all portions in combination. Still further detailed information, such as the allocation of the dispensed portions across the hours of the day may be developed, and interrogated, if desired.

In accordance with the present invention, certain information developed by the device 100 is normally privileged to be initialized, reinitialized, or changed only by action of INTERROGATOR 140. The INTERROGATOR 140 thus serves as a useful device for the owner of dispenser 10 to control its operations in certain details, such as the size of dispensed portions, and to interrogate in historical record, that is otherwise unchangeable, of the historical beverage dispensing activity. The amount of dispensing activity by portion, and by fluid ounces, may be compared with money receipts in order to assess whether such receipts are in accordance with the historical record of beverage dispensing operation.

In accordance with the present invention, either the KEYBOARD 120, or the INTERROGATOR 140, or both may be used in conjunction with firmware-programmed device 100 to preset the amount of mixture that will be dispensed for each particular portion. The device 100 may be caused, via data entry at KEYBOARD 120, to enter a mode where it will commence to flow mixed beverage upon one switch actuation, and will continue to flow mixed beverage until deactivation of that switch (or actuation of another switch). The person who is setting the dispensed volume amount for a particular portion size merely observes the filling of glass, or other container, 6 and actuates the beginning and ending switch actuations accordingly. The device 100 integrates the fluid flow between the switch actuations, developing a quantity which will thereafter be associated with the quantity which will be dispensed upon each dispensing operation for that particular portion. This quantity need not be integral number of fluid grams, ounces, or any other unit of measurement. It is, rather, a empirically-determined quantity which may be set in accordance with the volume of a particular glass, or container, 6. It may be set to be either generous or parsimonious in consideration of the nominal volume of such glass, or container, 6.

Figure 8B:
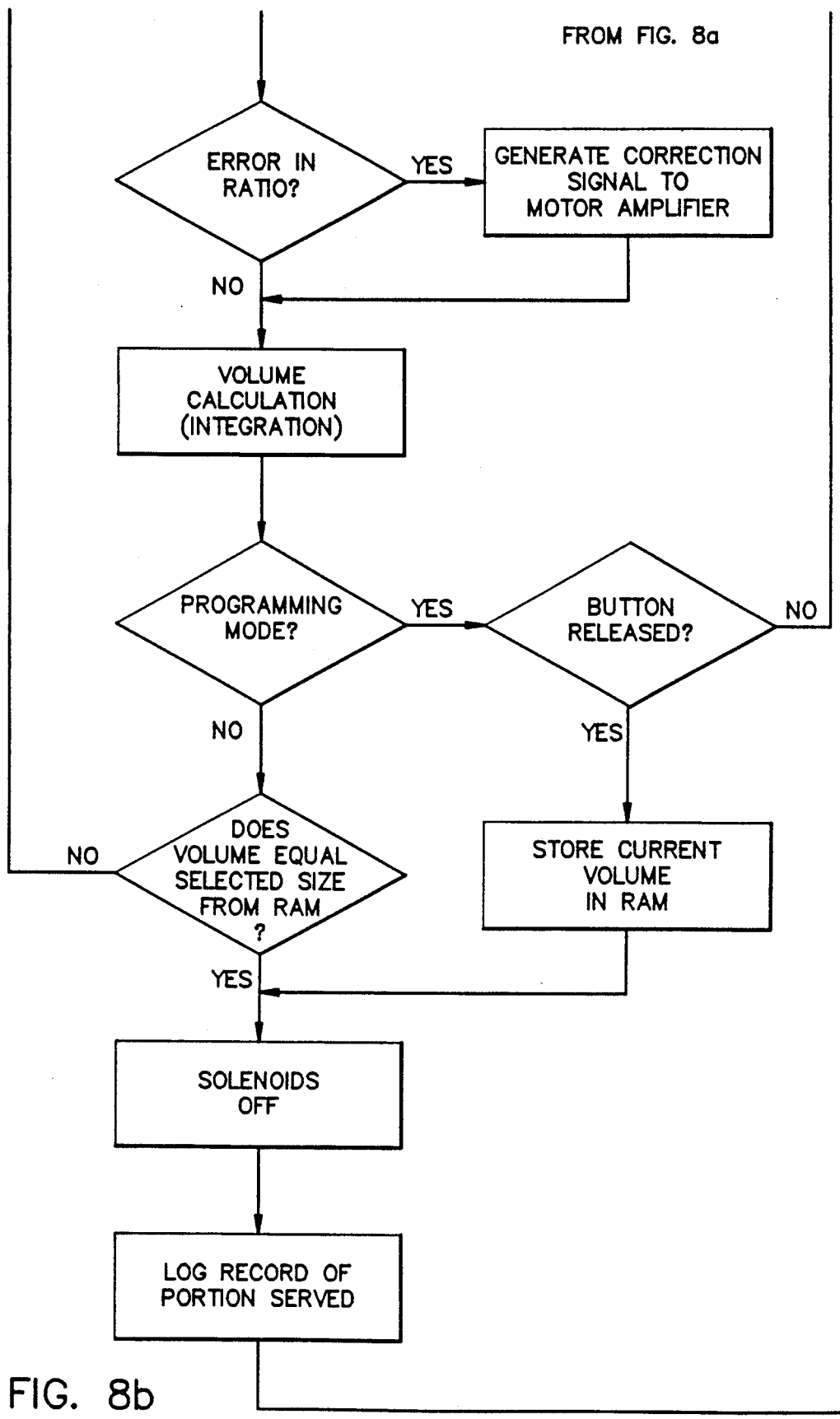
FIG. 8, consisting of FIG. 8a and FIG. 8b, is a flow chart of one control routine executable by a microprocessor that is used in the third embodiment of the post-mix soft drink dispenser in accordance with the present invention.

A flow chart of the firmware program executed by device 100 within the third embodiment of a control circuit 23 shown in FIG. 7 is shown in FIG. 8, consisting of FIG. 8a and FIG. 8b. The firmware program operates to permit the empirically-determined presetting of dispensed volume for a number of different sizes, to maintain the syrup and water flows at a prescribed relative ratio, to calculate the volume of dispensed fluid for dispensing control and/or dispensing volume preset, and to log a historical record of portions and volumes dispensed. Certain other aspects of the firmware program executed by device 100, such as its communications links to display 110, keyboard 120, and interrogator 140, are not flow charted because they are routinely implementated in the construction microcontroller-based digital control systems.

In accordance with the preceding discussion, the present invention will be recognized to accord considerable flexibility in the precision dispensing of fluids at a prescribed ratio, and to a predetermined volume. Because the fluid flows are very accurately determined, in a substantially viscosity-insensitive manner, it is possible to integrate such flows over time as a positive indication of the volume of each fluid component, and the total volume of all fluid components, that are dispensed. The flow rate of each fluid component is normally controlled, in real time, to be in a prescribed relative proportion to other fluid components. Correspondingly, the two or more fluids are continuously and constantly in the prescribed relative proportion.

In accordance with the preceding discussion, it will be recognized that the principles of the present invention are readily extensible to the control of more than two fluids, and to certain individual ones of a multiplicity of fluids on a selectable basis. For example, the third embodiment of the control circuit 23 shown in FIG. 7 might be extended to a multiplicity of fluid flow lines, such as lines used, for example, for the flow of different color paints. By selectable command entries made at keyboard 120 a properly firmware-programmed device 100 would be capable of controlling the fluid flows within various lines to be at exacting relative proportions, and would be capable of integrating the flows of all such fluids in real time until the specified volume had been precisely dispensed.

In accordance with these and other aspects of the present invention, the invention should be interpreted broadly, in accordance with the following claims, only, and not solely in accordance with those particular embodiments within which the invention has been taught.

What is claimed is:

1. An apparatus operative with
   a first fluid source means for supplying a first flow of a first fluid, the first fluid undergoing changes in viscosity, and with
   a second fluid source means for supplying a second flow of a second fluid, for dispensing the first fluid and the second fluid in a prescribed relative proportion, the apparatus comprising:
   a dispenser means, flow connected for receiving the first and the second fluid flows maintained in the prescribed relative proportion, for mixing together and dispensing both the first and the second fluids in the prescribed relative proportion;
   first conduit means for channeling the first flow of the first fluid between the first fluid source means and the dispenser means;
   second conduit means for channeling the second flow of the second fluid between the second fluid source means and the dispenser means;
   a first flow rate sensor means, flow connected in the first conduit means between the first fluid source means and the dispenser means, for producing a first sensor signal representative of the flow rate of the first fluid responsive to sensing the first flow of the first fluid, the producing being with substantial insensitivity to changes in the viscosity of the first fluid;
   a second flow rate sensor means, flow connected in the second conduit means between the second fluid source means and the dispenser means, for producing a second sensor signal representative of the flow rate of the second fluid responsive to sensing the second flow of the second fluid;
   a control means, receiving the first sensor signal from the first flow rate sensor means and the second sensor signal from the second flow rate sensor means, for producing a control signal;
   a flow control means, flow connected in one of the first conduit means and the second conduit means and receiving the control signal from the control means, for regulating fluid flow in that conduit means in which it is flow connected in accordance with the control signal, the regulation being so that the first flow of the first fluid in the first conduit means and the second flow of the second fluid in the second conduit means are in the prescribed relative proportion.

2. The apparatus for dispensing a first fluid and a second fluid in a prescribed relative proportion according to claim 1 wherein the first flow rate sensor means comprises:
   a housing defining a channel for transporting a flowing fluid in a direction from an upstream location to a downstream location;
   a differential pressure sensor, flow connected between the channel's upstream and downstream locations, for moving substantially perpendicularly to the direction of the flowing fluid in response to a static differential pressure between the upstream and downstream locations;
   a first flow obstructor operatively connected to the pressure sensor for (i) moving therewith in order to variably occlude the channel between the upstream and the downstream locations, and (ii) receiving frictional force from the flowing fluid in the direction of its movement; an area of the differential pressure sensor that is subject to, and responsive to, the differential pressure being more than twenty times larger than an area of the flow obstructor that is subject to the frictional force from the flowing fluid where it acts to variably occlude the channel;
   the operative connection between the differential pressure sensor and the first flow obstructor being so that an increased fluid frictional drag force on the first flow obstructor where it moves to variably occlude the channel acts mechanically oppositely to a change in a static differential pressure force on the differential pressure sensor due to the same increased fluid frictional drag force, the mechanically oppositely-acting forces tending to cancel each other; and
   a biasing means, operating between the housing and both the connected pressure sensor and first flow obstructor, for biasing the first flow obstructor to a position occluding fluid flow within the channel so that the differential pressure sensed by the pressure sensor remains at a predetermined level;
   wherein the movement of the differential pressure sensor is indicative of the rate of fluid flow, forming thereby a flowmeter;
   wherein the ratio of the pressure force exerted on the pressure sensor to the frictional forces exerted on the first flow obstructor approximately equals the ratio of the area of the pressure sensor to the area of the first flow obstructor, and is thus greater than twenty;
   wherein the sensed flow rate is substantially insensitive to changes in fluid frictional forces resulting from changes in fluid viscosity.

3. An apparatus for controlling a first flow of a first fluid from a first source and a second flow of a second fluid from a second source, at least the first of the first and the second fluids having both a variable viscosity and a flow rate from the first source that is in accordance with this variable viscosity, to be in a prescribed relative proportion, the flow-control apparatus comprising:
   a viscosity-insensitive first flow rate sensor means for producing with substantial insensitivity to variations in the viscosity of the first fluid a first sensor signal representative of the rate of the first flow;
   second flow rate sensor means for producing a second sensor signal representative of a rate of the second flow;
   control means, receiving the first sensor signal and the second sensor signal, for determining the proportion of the first flow rate of the first fluid relative to the second flow rate of the second fluid, and for producing a control signal that varies in accordance with this determining;
   flow control means, receiving the control signal, for regulating the first flow rate of the first fluid or the second flow rate of the second fluid or both the first flow rate of the first fluid and the second flow rate of the second fluid, in order that the two fluid rates are maintained in a prescribed relative proportion.

4. The flow control apparatus according to claim 3 wherein the viscosity-insensitive first flow rate sensor means comprises:
   a housing defining a channel for flowing fluid having a flow direction from an inlet port, past a flow-control location where the area of fluid flow is variably occluded, to an outlet port;

a differential pressure sensing means, flow connected to the flowing fluid at locations upstream and downstream of the channel's flow-control location, for moving in response to the difference in static pressure between the upstream and downstream locations, the flowing fluid at at least one of the upstream and downstream locations flowing over the pressure sensing means in a direction that is substantially perpendicular to a direction of the moving;

a force biasing means, connected between the differential pressure sensing means and the housing, for force biasing the movement of the differential pressure sensing means; and a flow control means, responsive to the differential pressure sensing means for moving in accordance therewith, for moving relative to the channel's flow-control location to variably occlude the channel;

wherein the differential pressure sensing means is, because of the perpendicular orientation of its movement relative to the flowing fluid at the at least one of the upstream and downstream locations, substantially insensitive in such movement to fluid friction and thus to fluid viscosity;

wherein the flow control means is, because of its movement to obstruct the fluid flow at the channel's flow control location, sensitive in such movement to fluid friction and thus to fluid viscosity;

the means to the differential pressure sensing means being so that an increased fluid frictional drag force on the flow control means where it moves to variably occlude the channel acts mechanically oppositely to a change in a static differential pressure force on the pressure sensing means due to the same increased fluid frictional drag force, the mechanically oppositely-acting forces tending to cancel each other; and the area of the differential pressure sensing means, with its substantial insensitivity to fluid friction and viscosity, being large relative to the area of the flow controller means, with its sensitivity to fluid friction and viscosity;

wherein the fluid flowmeter is thus substantially insensitive to fluid friction, and to fluid viscosity.

5. In an apparatus for dispensing a first fluid and a second fluid in prescribed relative proportions having a first fluid source means for supplying a first flow of a first fluid, a second fluid source means for supplying a second flow of a second fluid, a first flow rate sensor means, flow connected with the first fluid source means, for producing a first sensor signal responsive to a sensed first flow rate of the first fluid;

a second flow rate sensor means, flow connected with the second fluid source means, for producing a second sensor signal responsive to a sensed second flow rate of the second fluid, a control means, receiving the first sensor signal from the first flow rate sensor means and the second sensor signal from the second flow rate sensor means, for producing a control signal, regulator means, flow connected in one of the first flow and the second flow and receiving the control signal from the control means, for regulating fluid flow in accordance with the control signal so that the flow rates of the first and of the second fluids are in a prescribed relative proportion, and dispenser means, receiving the first and the second fluid flow at the prescribed relative proportion between the flow rates, for mixing together and dispensing over a period of time both the first and the second fluids in a volume that is of a prescribed relative proportion between the first fluid and the second fluid, continuous flow regulation means, flow connected in a one of the first flow and the second flow and receiving the control signal from the control means, for regulating instantaneous fluid flow in accordance with the control signal so that the flow rates of the first and of the second fluids are continuously and constantly maintained in the prescribed relative proportion.

6. The improvement to an apparatus for dispensing a first fluid and a second fluid in prescribed relative proportions according to claim 5 wherein the first flow rate sensor means comprises:

a first flowmeter; and wherein the second flow rate sensor means comprises:

a second flowmeter; and wherein the continuous flow regulation means comprises:

an electronically controllable flow regulator.

7. The improvement to an apparatus for dispensing a first fluid and a second fluid in prescribed relative proportions according to claim 6 wherein the electronically controllable flow regulator comprises:

a motorized metering pin.

8. In an apparatus for dispensing a first fluid and a second fluid in a prescribed relative proportion having a source of a first fluid flow, a source of a second fluid flow, a first sensor means, flow connected to the first source, for producing a first flow rate signal responsive to sensing the first fluid flow, a second sensor means, flow connected to the second source, for producing a second flow rate signal responsive to sensing the second fluid flow, a control circuit means, responsive to the first and the second flow rate signals, for producing a flow control signal, a regulator means, flow connected to the first source, for regulating the first fluid flow in response to the flow control signal, and a dispenser, receiving the regulated first fluid flow and the second fluid flow, for mixing together and dispensing both the first and second fluids in the prescribed relative proportion, an improvement wherein the control circuit means comprises:

amplifier means, responsive to the first and the second flow rate signals, for amplifying each of such first and second flow rate signals at a predeterminable relative gain in order to produce the flow control signal;

wherein the prescribed relative proportion between the first and the second fluid is predeterminable by the predetermination of the relative gain of the amplifier means.

9. The improvement to the control circuit of a dispensing apparatus according to claim 8

10. In an apparatus for disposing a first fluid and a second fluid in prescribed relative proportions having a first fluid source means for supplying a first flow of a first fluid, a second fluid source means for supplying a second flow of a second fluid, at least one flow rate sensor means, flow connected with a one of the first and the second fluid source means, for producing a sensor signal responsive to sensing the rate of fluid flow from this one source means, a control means, receiving the sensor signal from the flow rate sensor means and possessing knowledge of a remaining flow rate from a remaining source means not flow-connected to the at least one flow rate sensor means, for producing a control signal;

a flow control means, flow connected in a one of the first flow and the second flow and receiving the control signal from the control means, for regulating fluid flow in accordance with the control signal so that the first flow of the first fluid and the second flow of the second fluid are in a prescribed relative proportion, and dispenser means, receiving the first and the second fluid flows in the prescribed relative proportion, for mixing together and dispensing both the first and the second fluids in the prescribed relative proportion, the improvement comprising:

the at least one flow rate sensor means is substantially insensitive in producing the sensor signal to variations in the viscosity of the fluid for which flow rate is sensed.

11. An apparatus operative with a first fluid source means for supplying a first flow of a first fluid, the first fluid undergoing changes in viscosity, and with a second fluid source means for supplying a second flow of a second fluid, for dispensing the first fluid and the second fluid in a prescribed relative proportion, the apparatus comprising:

a dispenser means for receiving the first and the second fluid flows maintained in the prescribed relative proportion, and for mixing together and dispensing both the first and the second fluids in the prescribed relative proportion;

a first conduit means for channeling the first flow of the first fluid between the first fluid source means and the dispenser means;

a second conduit means for channeling the second flow of the second fluid between the second fluid source means and the dispenser means;

a first differential pressure flow rate sensor means, flow connected in the first conduit means between the first fluid source means and the dispenser means, for producing with substantial insensitivity to changes in viscosity of the first fluid a first flow rate signal representative of the flow rate of the first fluid, the producing being in response to sensing a flow-rate-sensitive pressure difference between upstream and downstream locations in the first conduit means;

a second flow rate sensor means, flow connected in the second conduit means between the second fluid source means and the dispenser means, for producing a second flow rate signal representative of the flow rate of the second fluid responsive to sensing the flow rate thereof between upstream and downstream locations in the second conduit means;

a control means, receiving the first flow rate signal from the first flow rate sensor means and the second flow rate signal from the second flow rate sensor means, for producing a control signal;

a flow control means, flow connected in a one of the first conduit means and the second conduit means and receiving the control signal from the control means, for regulating fluid flow in that conduit means in which it is flow connected in accordance with the control signal, the regulation being so that the first flow of the first fluid and the second flow of the second fluid are maintained in the prescribed relative proportion.

12. An apparatus operative with a first fluid source means for supplying a first flow of a first fluid, the first fluid undergoing changes in viscosity, and with a second fluid source means for supplying a second flow of a second fluid, for dispensing the first fluid and the second fluid in a prescribed relative proportion, the apparatus comprising:

a dispenser means for receiving the first and the second fluid flows maintained in the prescribed relative proportion, and for mixing together and dispensing both the first and the second fluids in the prescribed relative proportion;

a first conduit means for channeling the first flow of the first fluid between the first fluid source means and the dispenser means;

a second conduit means for channeling the second flow of the second fluid between the second fluid source means and the dispenser means;

a first differential pressure flow rate sensor means, flow connected in the first conduit means between the first fluid source means and the dispenser means, for producing with substantial insensitivity to changes in viscosity of the first fluid a first flow rate signal representative of the flow rate of the first fluid, the producing being in response to sensing a flow-rate-sensitive pressure difference between upstream and downstream locations in the first conduit means;

a means for predetermining a flow rate at the second fluid within the second conduit;

a control means, receiving the first flow rate signal from the first flow rate sensor means and knowledgeable of the predetermined flow rate of the second fluid, for producing a control signal;

a flow control means, flow connected in the first conduit means and receiving the control signal from the control means, for regulating fluid flow in the first conduit means in accordance with the control signal, the regulation being so that the first flow of the first fluid and the second flow of the second fluid are maintained in the prescribed relative proportion.

* * * * *